(12) United States Patent
Cha et al.

(10) Patent No.: US 10,331,329 B2
(45) Date of Patent: Jun. 25, 2019

(54) ELECTRONIC DEVICE AND METHOD FOR CHANGING ORDER OR LOCATION OF CONTENT

(71) Applicant: Samsung Electronics Co., Ltd., Suwon-si, Gyeonggi-do (KR)

(72) Inventors: Soon-Hyun Cha, Seoul (KR); Yang-Su Kim, Yongin-si (KR); Jae-Wan Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 14/322,170

(22) Filed: Jul. 2, 2014

(65) Prior Publication Data

US 2015/0012860 A1 Jan. 8, 2015

(30) Foreign Application Priority Data

Jul. 8, 2013 (KR) ........................ 10-2013-0079687

(51) Int. Cl.
*G06F 3/0486* (2013.01)
*G06F 3/0482* (2013.01)
(Continued)

(52) U.S. Cl.
CPC .......... *G06F 3/0486* (2013.01); *G06F 3/0482* (2013.01); *G06F 3/0485* (2013.01);
(Continued)

(58) Field of Classification Search
CPC .... G06F 3/0486; G06F 3/0482; G06F 3/0485;
G06F 3/0488; G06F 3/04886; G06F 3/0452; G06F 11/1471; G06F 3/04817; G06F 3/04855; G06F 3/04883; G06F 11/1458; G06F 17/3079; G06F 2201/82; G06F 2201/825; G06F 2201/84;
(Continued)

(56) References Cited

U.S. PATENT DOCUMENTS 5,995,079 A * 11/1999 Sheasby .............. G06F 3/04847
715/772
7,934,167 B2 * 4/2011 Happonen ............. G06F 3/0485
715/783

(Continued)

FOREIGN PATENT DOCUMENTS

KR 10-2011-037298 A 4/2011
KR 10-2011-0093097 A 8/2011

OTHER PUBLICATIONS

Merriam-Webster, "Definition of Direction", https://www.merriam-webster.com/dictionary/direction.*

(Continued)

*Primary Examiner* — Tuyetlien T Tran
(74) *Attorney, Agent, or Firm* — Jefferson IP Law, LLP

(57) ABSTRACT

An electronic device and a method for changing an order and location of content are provided. The method includes receiving a selection of a content from among a displayed plurality of contents, displaying, in a set region, a guide interface of expressing a current location of the selected content among the entire contents of a storage region, and changing the location of the selected content among the contents of the storage region according to sensing a control of the guide interface.

14 Claims, 9 Drawing Sheets

(51) Int. Cl.
*G06F 3/0485* (2013.01)
*G06F 3/0488* (2013.01)
*G06F 3/0484* (2013.01)
*G06F 3/0481* (2013.01)

(52) U.S. Cl.
CPC ........ *G06F 3/0488* (2013.01); *G06F 3/04883* (2013.01); *G06F 3/0481* (2013.01); *G06F 3/04847* (2013.01); *G06F 3/04855* (2013.01); Y10S 715/973 (2013.01)

(58) Field of Classification Search
CPC ........ G06F 2203/0335; G06F 3/03543; G06F 3/0362; Y10S 715/973
USPC .......................................... 715/810, 841, 845
See application file for complete search history.

(56) References Cited

U.S. PATENT DOCUMENTS

| | | | |
|---|---|---|---|
| 9,047,356 B2* | 6/2015 | Puppin | G06F 17/30575 |
| 9,104,262 B2* | 8/2015 | Wang | G06F 3/0485 |
| 9,158,765 B1* | 10/2015 | Story, Jr. | G06F 17/30 |
| 2005/0262451 A1* | 11/2005 | Remignanti | G06F 3/04847 |
| | | | 715/833 |
| 2007/0150830 A1* | 6/2007 | Ording | G06F 3/0481 |
| | | | 715/784 |
| 2007/0291018 A1* | 12/2007 | Park | G06F 3/03547 |
| | | | 345/184 |
| 2008/0024444 A1* | 1/2008 | Abe | G06F 3/0485 |
| | | | 345/157 |
| 2008/0163039 A1* | 7/2008 | Ryan | G06F 3/147 |
| | | | 715/206 |
| 2008/0165136 A1* | 7/2008 | Christie | G06F 3/0482 |
| | | | 345/173 |
| 2008/0165153 A1* | 7/2008 | Platzer | G06F 1/1626 |
| | | | 345/173 |
| 2008/0178116 A1* | 7/2008 | Kim | G06F 3/04855 |
| | | | 715/786 |
| 2009/0100373 A1* | 4/2009 | Pixley | G06F 3/03543 |
| | | | 715/786 |
| 2009/0183076 A1* | 7/2009 | Shim | G06F 3/0482 |
| | | | 715/716 |
| 2009/0193351 A1* | 7/2009 | Lee | G06F 3/0482 |
| | | | 715/769 |
| 2009/0210810 A1 | 8/2009 | Ryu et al. | |
| 2010/0039399 A1* | 2/2010 | Kim | G06F 3/0482 |
| | | | 345/173 |
| 2010/0125786 A1* | 5/2010 | Ozawa | G06F 3/04845 |
| | | | 715/702 |
| 2010/0164895 A1* | 7/2010 | Kim | G06F 3/0488 |
| | | | 345/173 |
| 2011/0072394 A1* | 3/2011 | Victor | G06F 3/0482 |
| | | | 715/821 |
| 2011/0078622 A1* | 3/2011 | Missig | G06F 3/0486 |
| | | | 715/784 |
| 2011/0087997 A1* | 4/2011 | Lee | G06F 3/0482 |
| | | | 715/830 |
| 2011/0090255 A1* | 4/2011 | Wilson | G06F 3/04817 |
| | | | 345/647 |
| 2011/0165913 A1* | 7/2011 | Lee | G06F 3/04855 |
| | | | 455/566 |
| 2011/0167369 A1* | 7/2011 | van Os | G06F 3/0483 |
| | | | 715/769 |
| 2011/0175829 A1* | 7/2011 | Miyazawa | G06F 3/041 |
| | | | 345/173 |
| 2011/0225539 A1* | 9/2011 | Lee | G06F 3/0485 |
| | | | 715/784 |
| 2011/0252373 A1* | 10/2011 | Chaudhri | G06F 3/04817 |
| | | | 715/835 |
| 2012/0272183 A1* | 10/2012 | Jitkoff | G06F 3/0485 |
| | | | 715/786 |
| 2013/0104074 A1* | 4/2013 | Takahashi | G06F 3/0485 |
| | | | 715/784 |
| 2013/0307792 A1* | 11/2013 | Andres | G11B 27/005 |
| | | | 345/173 |
| 2015/0206002 A1* | 7/2015 | Ponten | G06K 9/00355 |
| | | | 382/103 |
| 2015/0220776 A1* | 8/2015 | Cronholm | G06F 3/017 |
| | | | 382/103 |

OTHER PUBLICATIONS

Merriam-Webster, definition of word "embedded", accessed on Jun. 21, 2018, https://www.merriam-webster.com/dictionary/embedded (Year: 2018).*
Galitz, "The Essential Guide to User Interface Design, Second Edition", published on 2002, ISBN: 0-471-084646, p. 285, 316, 481 (Year: 2002).*
Sollazzo, Communication Pursuant to Article 94(3) EPC regarding Application No. 14 175 884.7-1972, dated Dec. 4, 2015, European Patent Office, Munich, Germany.
"Rapid relocation of items in long lists," IP.com Journal, Nov. 9, 2009, XP013135194, 1533-0001, IP.com, Inc., West Henrietta, NY, USA.

* cited by examiner

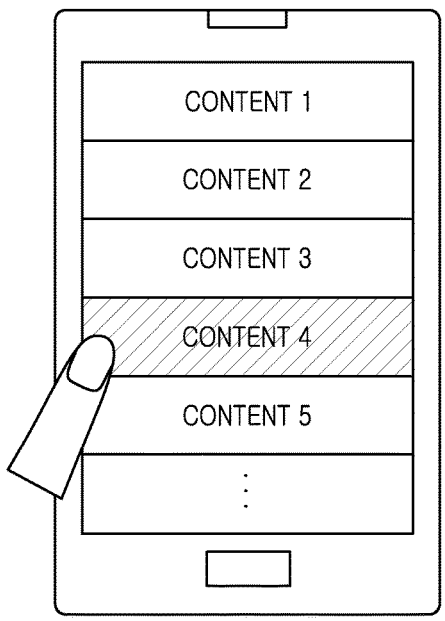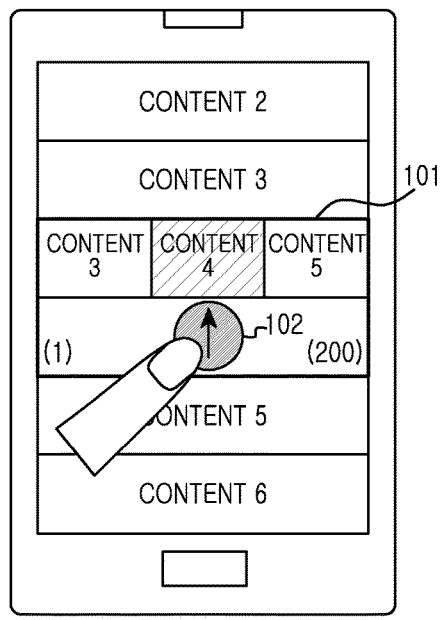
FIG.1A  FIG.1B
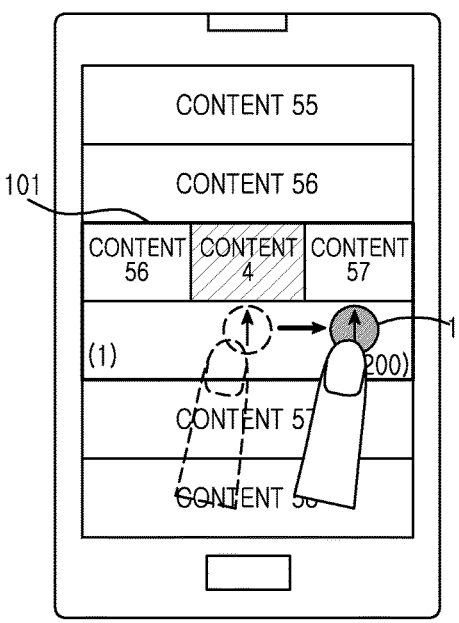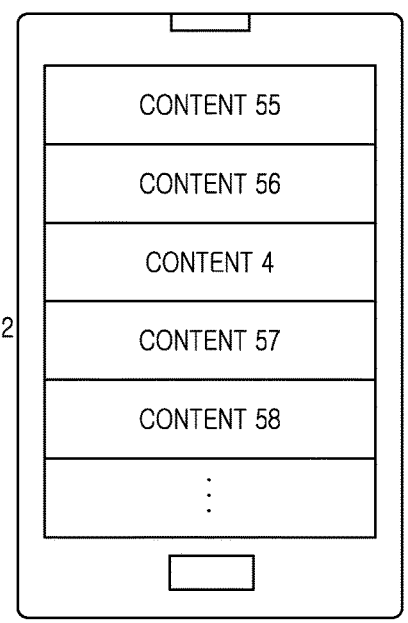
FIG.1C  FIG.1D

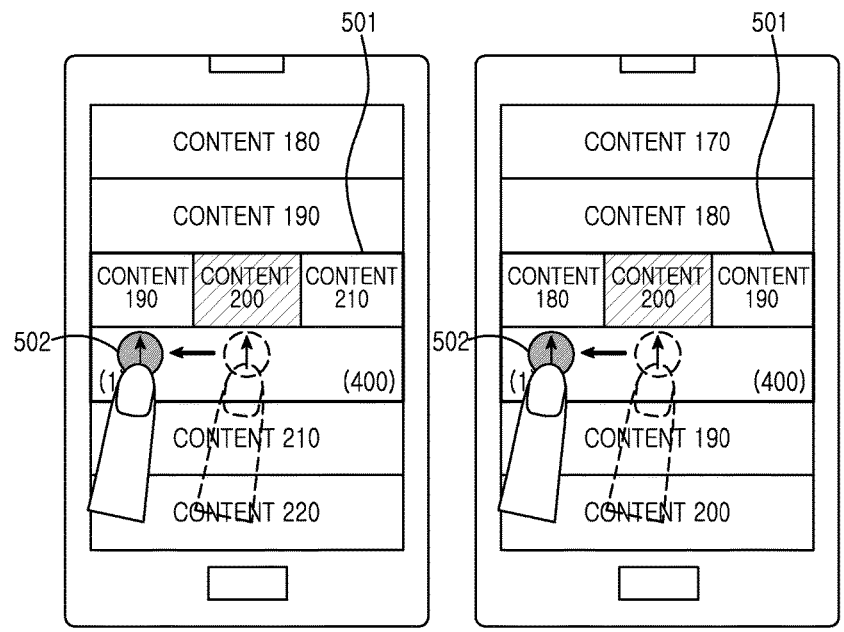
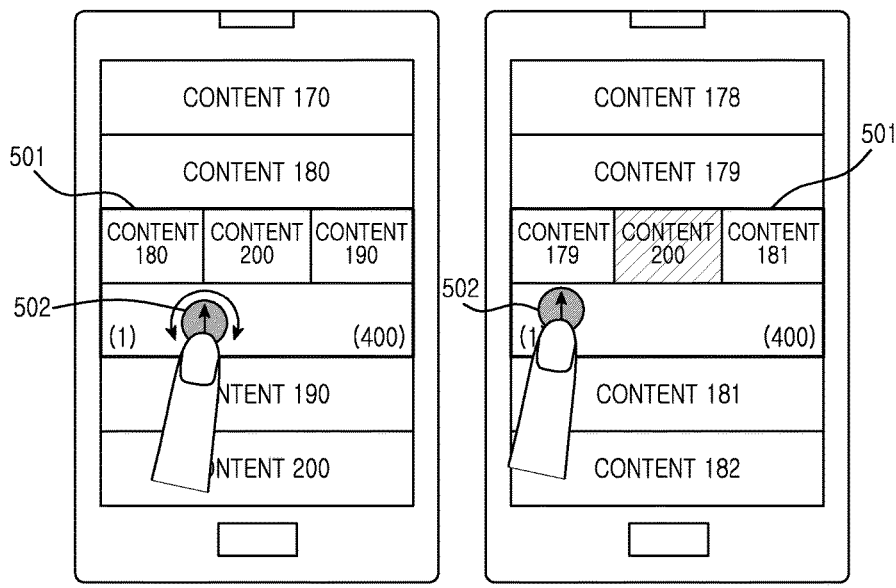
FIG.5A  FIG.5B
FIG.5C  FIG.5D

ELECTRONIC DEVICE AND METHOD FOR CHANGING ORDER OR LOCATION OF CONTENT

CROSS-REFERENCE TO RELATED APPLICATION(S)

This application claims the benefit under 35 U.S.C. § 119(a) of a Korean patent application filed on Jul. 8, 2013, in the Korean Intellectual Property Office and assigned Serial number 10-2013-0079687, the entire disclosure of which is hereby incorporated by reference.

TECHNICAL FIELD

The present disclosure relates to an electronic device and method for changing the order or location of content.

BACKGROUND

With the development of functions of electronic devices, the electronic devices are now able to store a variety of contents expanding according their available storage spaces. For example, the electronic devices are now able to store and manage a plurality of sound sources, videos, phone numbers, and the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method capable of improving a convenience of a user, by quickly and easily changing the order or location of content using a guide interface displayed in a set location.

Another aspect of the present disclosure is to provide an apparatus and method capable of reducing an interaction of a user, by varying a range of scrolling contents according to controlling a guide interface and conveniently moving content intended to be changed in location to a desired location.

The above aspects are achieved by providing an electronic device and method for changing the order or location of content.

In accordance with an aspect of the present disclosure, a method of operating an electronic device is provided. The method includes receiving a selection of a content from among a displayed plurality of contents, displaying, in a set region, a guide interface expressing a current location of the selected content among entire contents of a storage region, and changing the location of the selected content among the contents of the storage region according to sensing a control of the guide interface.

In accordance with an aspect of the present disclosure, an electronic device is provided. The electronic device includes a touch screen and a processor module. The touch screen is configured to receive a selection of a content from among a displayed plurality of contents, and to display in a set region a guide interface expressing a current location of the selected content among entire contents of a storage region.

The processor module is configured to change the location of the selected content according to sensing a control of the guide interface.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A, 1B, 1C, and 1D illustrate a diagram illustrating the first embodiment of changing the order of content according to an embodiment of the present disclosure;

FIGS. 5A, 5B, 5C, and 5D illustrate a diagram illustrating the second embodiment of varying a range of scrolling a plurality of contents according to a dragged direction and sequentially displaying the plurality of contents according to an embodiment of the present disclosure;

Throughout the drawings, it should be noted that like reference numbers are used to depict the same or similar elements, features, and structures.

DETAILED DESCRIPTION

Figure 2A:
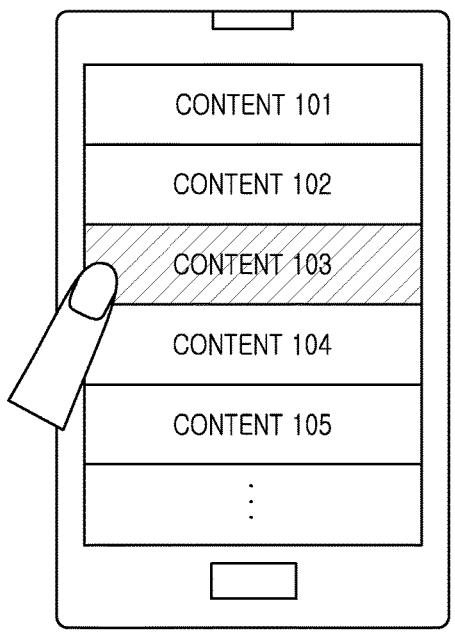
FIGS. 2A, 2B, 2C, and 2D illustrate a diagram illustrating the second embodiment of changing the order of content according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1A, 1B, 1C, and 1D illustrate a diagram illustrating a first embodiment of changing an order of content according to an embodiment of the present disclosure.

In the example below, a plurality of contents have been stored according to a kind of content in each storage region of an electronic device. For example, assume that contents related to sound sources (e.g., audio files) have been stored in the form of contents in an "A storage region" of the electronic device, contents related to videos have been stored in the form of contents in a "B storage region" of the electronic device, and phone numbers have been stored in the form of contents in a "C storage region" of the electronic device. Each storage region may represent a specific order or arrangement of contents, such as a playlist. Consider a case where a user intends to change the location of any one sound source among the sound sources stored in the "A storage region".

First, the electronic device can receive a selection of any one storage region from among at least one storage region each including a plurality of contents, and display the plurality of contents included in the selected storage region, and receive an input of an instruction of changing the alignment order of the displayed plurality of contents. For example, the electronic device can receive a selection of the "A storage region" having stored the contents related to the sound sources, display the plurality of contents included in the selected "A storage region", and receive an input of an instruction of changing the alignment order of the displayed plurality of contents.

Referring to FIG. 1A, the electronic device can receive a selection of any one content from among the displayed plurality of contents. In more detail, the electronic device can receive a selection of a content intended to be changed in location among the plurality of contents displayed on a touch screen of the electronic device. For example, after the electronic device displays the plurality of contents related to the sound sources in the form of contents on the touch screen of the electronic device, the electronic device can receive a touch input of "content 4" intended to be changed in location among the displayed plurality of contents.

Referring to FIG. 1B, the electronic device can display in a set region a guide interface 101 expressing a current location of the selected content among the entire contents in the storage region. In more detail, the electronic device can display in the set region the guide interface 101 enabling the user to easily move the selected content to a desired location. For example, if the electronic device receives a selection of "content 4" from among the plurality of contents stored in the "A storage region", the electronic device can display in a "content 4" region the guide interface 101 that is a region expressing the number of the entire contents and a current location of the selected content "content 4" among the entire contents of the region within a range of the number of the entire contents.

Here, expressing the number of the entire contents and the current location of the selected content among the entire contents region within the range of the number of the entire contents represents expressing by a numeral the number of the entire contents and how many contents among the entire contents have been aligned before the selected content. For example, as illustrated in FIG. 1B, a numeral "200" at a right low space of the second row of the guide interface 101 indicates the total number of the contents related to the sound sources stored in the "A storage region", and the "content 4" selected to change its location indicates that content is aligned fourth among the total of two hundred contents. That is, the guide interface 101 displays the number of the entire contents and the current location of the selected content among the number of the entire contents together, so the guide interface 101 provides a convenience that the user can quickly and easily determine the current location of the selected content and a location to which the user intends to move the selected content.

Also, an icon 102 enabling the user to easily move the selected content to a desired location can be included and displayed in the set region of the guide interface 101. In more detail, the icon 102 is included and displayed in the guide interface 101 of the electronic device such that the electronic device can easily move the selected content according to sensing the input of the icon 102.

Referring to FIG. 1C, the electronic device can sense the control of the guide interface 101. In more detail, after receiving a touch input of the icon 102 included in the guide interface 101 and expressing the current location of the selected content, the electronic device can confirm that the icon 102 is dragged in a first direction or a second direction in a state where the touch input of the icon 102 is maintained. For example, after receiving a selection of the icon 102 included in the guide interface 101, the electronic device can confirm that the icon 102 is dragged in a left direction or a right direction in the state where the touch input of the icon 102 is maintained. In this embodiment, the electronic device can confirm that the icon 102 is dragged in the right direction in the state where the touch input of the icon 102 included in the guide interface 101 is maintained.

Next, as the icon 102 is dragged in the first direction or the second direction, the electronic device can scroll the respective contents including corresponding contents names according to the dragged direction of the icon 102 and display the scrolling result. For example, if the electronic device confirms that the icon 102 is dragged in the right direction in the state where the touch input of the icon 102 is maintained, the electronic device can sequentially scroll the respective contents within a range of up to a maximum "content 200", starting from the selected content "content 4". Here, although not illustrated in FIG. 1C, the respective contents can be displayed including corresponding contents names. For example, the respective contents can be displayed including names of corresponding sound sources. Accordingly, the user can change the order of the sound source that the user intends to play, with reference to the corresponding contents names included in the respective contents.

Referring to FIG. 1D, if the electronic device senses that the touch input of the icon 102 has ended, the electronic device can move the selected content to a location corresponding to where the touch input of the icon 102 has ended according to the dragged direction and dragged location of the icon 102, and change the alignment order of the contents. For example, if the electronic device senses that the location in which the touch input of the icon 102 has ended is between "content 56" and "content 57", the electronic device can change the location of the selected content "content 4" into a location between the "content 56" and the "content 57".

In a conventional electronic device, if a user intends to change the location of content, the user must manually move the content to a desired location by holding a touch input of the content intended to be changed in location. Accordingly, in the conventional electronic device, if a distance between a current location of the selected content and the location to which the user intends to move the selected content is large, a long time is not only taken up to the desired location but also there is an inconvenience of having to hold the touch input of the content intended to be moved up to the desired location.

In the electronic device according to the present disclosure, if the user only drags in the first direction or second direction the icon 102 included and displayed in the guide interface 101 displayed in the set region, the user can quickly and easily change the order of content to the desired location. Accordingly, the electronic device according to the present disclosure is able to not only improve a convenience of the user input but also provide a benefit of quickly and easily moving the content intended to be changed in location to the desired location, thereby greatly reducing an interaction time required of the user to achieve the desired result.

FIGS. 2A, 2B, 2C, and 2D illustrate a diagram illustrating the second embodiment of changing the order of content according to an embodiment of the present disclosure.

In the example below, a plurality of contents have been stored according to a kind of content in each storage region of an electronic device. For example, assume that contents related to sound sources (e.g., audio files) have been stored in the form of contents in an "A storage region" of the electronic device, contents related to videos have been stored in the form of contents in a "B storage region" of the electronic device, and phone numbers have been stored in the form of contents in a "C storage region" of the electronic device. Consider a case where a user intends to change the location of any one video among the videos stored in the "B storage region".

First, the electronic device can receive a selection of any one storage region among at least one storage region each including a plurality of contents, display the plurality of contents included in the selected storage region, and receive an input of an instruction of changing the alignment order of the displayed plurality of contents. For example, the electronic device can receive a selection of the "B storage region" having stored the contents related to the videos, display the plurality of contents included in the selected "B storage region", and receive an input of an instruction of changing the alignment order of the displayed plurality of contents.

Referring to FIG. 2A, the electronic device can receive a selection of any one content among the displayed plurality of contents. In more detail, the electronic device can receive a selection of any one content intended to be changed in location from among the plurality of contents displayed on a touch screen of the electronic device. For example, after the electronic device displays the plurality of contents related to the videos in the form of contents on the touch screen of the electronic device, the electronic device can receive a touch input of "content 103" intended to be changed in location among the displayed plurality of contents.

Figure 2B:
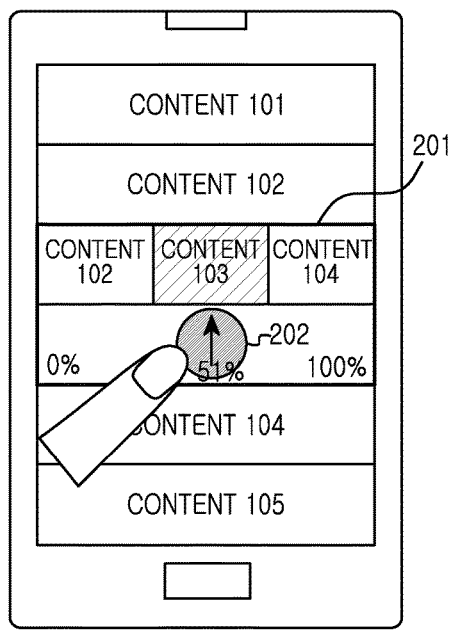

Referring to FIG. 2B, the electronic device can display in a set region a guide interface 201 expressing a current location of the selected content among the entire contents of the storage region. In more detail, the electronic device can display in the set region the guide interface 201 enabling the user to quickly and easily move the selected content to a desired location. For example, if the electronic device receives a selection of "content 103" among the plurality of contents stored in the "B storage region", the electronic device can display the guide interface 201 that is a region expressing the current location of the selected content "content 103" among the entire contents region in a "content 103" region by a percentage.

Here, expressing the current location of the selected content among the entire contents of the storage region by the percentage represents expressing in the guide interface 201 a location in which the selected content is located among the entire contents of the storage region according to the percentage. For example, as illustrated in FIG. 2B, assuming that the number of the entire contents of the storage region is equal to '200' and content selected to change its current location is aligned in the one hundred and third location among the total of two hundred contents, the electronic device can express by the percentage that the currently selected content "content 103" is located in a location of 51% of the entire contents region (102 of 200, or 51%, of the total contents are aligned prior to the selected content "content 103"). That is, the guide interface 201 can display the current location of the selected content among the entire contents region by the percentage, and provide a convenience such that the user can quickly and easily determine the current location of the selected content and a location to which the user intends to move the selected content.

An icon 202 enabling the user to quickly and easily move the selected content to a desired location can be included and displayed in the set region of the guide interface 201. In more detail, the icon 202 is included and displayed in the guide interface 201 of the electronic device such that the electronic device can easily move the selected content according to sensing the input of the icon 202.

Figure 2C:
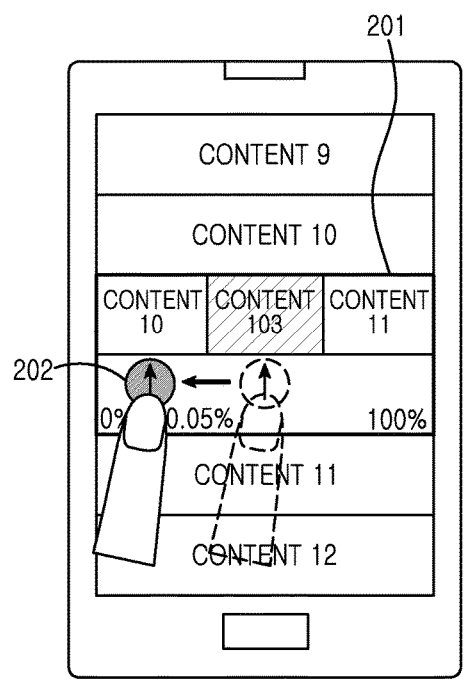

Referring to FIG. 2C, the electronic device can sense the control of the guide interface 201. In more detail, after receiving a touch input of the icon 202 included in the guide interface 201 and expressing the current location of the selected content, the electronic device can confirm that the icon 202 is dragged in a first direction or a second direction in a state where the touch input of the icon 202 is maintained. For example, after receiving a selection of the icon 202 included in the guide interface 201, the electronic device can confirm that the icon 202 is dragged in a left direction or a right direction in the state where the touch input of the icon 202 is maintained. In this example, the electronic device can confirm that the icon 202 is dragged in the left direction in the state where the touch input of the icon 202 included in the guide interface 201 is maintained.

Next, as the icon 202 is dragged in the first direction or the second direction, the electronic device can scroll the respective contents, including corresponding contents names, according to the dragged direction of the icon 202 and display the scrolling result. For example, if the electronic device confirms that the icon 202 is dragged in the left direction in the state where the touch input of the icon 202 is maintained, the electronic device can sequentially scroll the respective contents within a range of up to a maximum extent "content 1" in the left direction starting from the selected content "content 103". Here, although not illustrated in FIG. 2C, the respective contents can be displayed including the corresponding contents names. For example, the respective contents can be displayed including names of corresponding videos. Accordingly, the user can change the order of the video that the user intends to play, with reference to the corresponding contents names included in the respective contents.

Figure 2D:
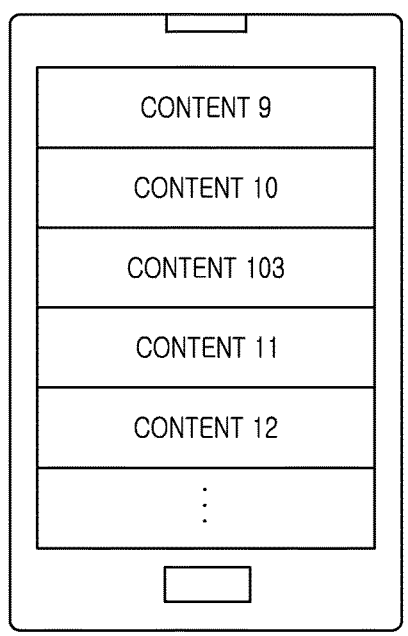

Referring to FIG. 2D, if the electronic device senses that the touch input of the icon 202 has ended, the electronic device can move the selected content to a location corresponding to where the touch input of the icon 202 has ended according to the dragged direction and dragged location of the icon 202, and change the alignment order of the contents. For example, if the electronic device senses that the location in which the touch input of the icon 202 has ended is between "content 10" and "content 11", the electronic device can change the location of the selected content "content 103" into a location between "content 10" and "content 11".

FIGS. 3A, 3B, 3C, and 3D illustrate a diagram illustrating a third embodiment of changing the order of content according to an embodiment of the present disclosure.

In the example below, assume that a plurality of contents have been stored according to a kind of content in each storage region of an electronic device. For example, assume that contents related to sound sources have been stored in the form of contents in an "A storage region" of the electronic device, contents related to videos have been stored in the form of contents in a "B storage region" of the electronic device, and phone numbers have been stored in the form of contents in a "C storage region" of the electronic device. Consider a case where a user intends to change the location of any one phone number among the phone numbers stored in the "C storage region".

First, the electronic device can receive a selection of any one storage region among at least one storage region each including a plurality of contents, display the plurality of contents included in the selected storage region, and receive an input of an instruction of changing the alignment order of the displayed plurality of contents. For example, the electronic device can receive a selection of the "C storage region" having stored the contents related to the phone numbers, display the plurality of contents included in the selected "C storage region", and receive an input of an instruction of changing the alignment order of the displayed plurality of contents in the storage region.

Figure 3A:
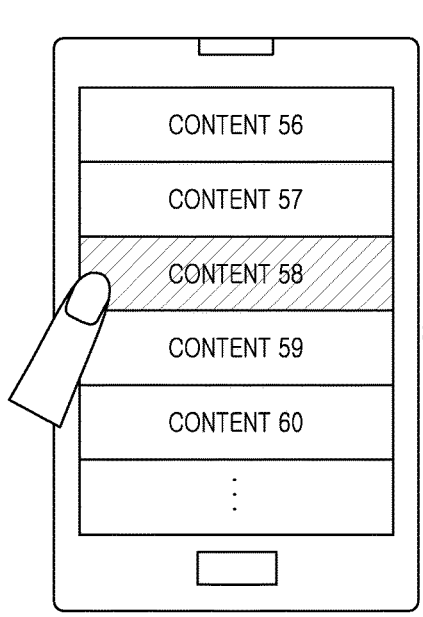
FIGS. 3A, 3B, 3C, and 3D illustrate a diagram illustrating the third embodiment of changing the order of content according to an embodiment of the present disclosure.

Referring to FIG. 3A, the electronic device can receive a selection of any one content among the displayed plurality of contents. In more detail, the electronic device can receive a selection of a content intended to be changed in location among the plurality of contents displayed on a touch screen of the electronic device. For example, after the electronic device displays a plurality of phone numbers in the form of contents on the touch screen of the electronic device, the electronic device can receive a touch input of "content 58" intended to be changed in location among the displayed plurality of phone numbers.

Figure 3B:
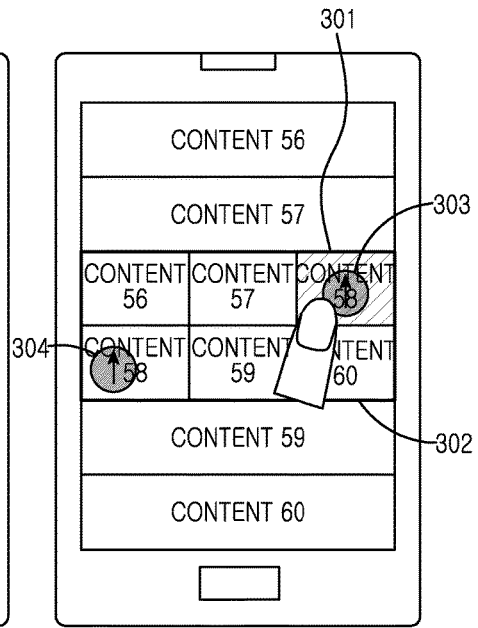

Referring to FIG. 3B, the electronic device can display in a set region guide interfaces 301 and 302 expressing a current location of the selected content among the entire contents of the storage region. In more detail, the electronic device can display in the set region the guide interfaces 301 and 302 enabling the user to easily move the selected content to a desired location. For example, if the electronic device receives a selection of "content 58" from among the plurality of contents stored in the "C storage region", the electronic device can display the guide interfaces 301 and 302 that are regions of dividing the entire contents into the two regions on a basis of the selected content and expressing the division result in a "content 58" region. Note that in this embodiment, the selected content "content 58" is displayed in both the first guide interface 301 and in the second guide interface 302.

Here, the two regions can be a first guide interface 301 of expressing to start from the first content and locate the selected content at the end according to the alignment order of the entire contents and a second guide interface 302 of expressing to start from the selected content and sequentially locate contents following the selected content. In more detail, when the electronic device intends to change the location of the selected content to the front of the selected content, the electronic device can receive a selection of an icon 303 included in the first guide interface 301. When the electronic device intends to change the location of the selected content to the rear of the selected content, the electronic device can receive a selection of an icon 304 included in the second guide interface 302. Accordingly, when the user intends to change the location of content intended to be changed in location to the front of the content intended to be changed in location, the user can select the icon 303 of the first guide interface 301 and, when the user intends to change the location of the content intended to be changed in location to the rear of the content intended to be changed, the user can select the icon 304 of the second guide interface 302, thereby being capable of quickly and easily moving the location of the content.

Figure 3C:
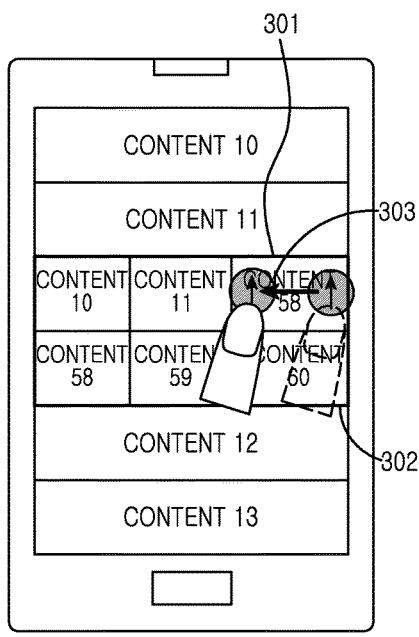

Referring to FIG. 3C, the electronic device can sense the control of the guide interfaces 301 and 302. In more detail, after receiving a touch input of the icon 303 included in the guide interfaces 301 and 302 and expressing the current location of the selected content, the electronic device can confirm that the icon 303 is dragged in a first direction or a second direction in a state where the touch input of the icon 303 is maintained. For example, after receiving a selection of the icon 303 included in the guide interfaces 301 and 302, the electronic device can confirm that the icon 303 is dragged in a left direction or a right direction in the state where the touch input of the icon 303 is maintained. In this embodiment, the electronic device can confirm that the icon 303 is dragged in the left direction in the state where the touch input of the icon 303 included in the first guide interface 301 is maintained.

Next, as the icon 303 is dragged in the first direction or the second direction, the electronic device can scroll the respective contents including corresponding contents names according to the dragged direction of the icon 303 and display the scrolling result. For example, if the electronic device confirms that the icon 303 is dragged in the left direction in the state where the touch input of the icon 303 is maintained, the electronic device can sequentially scroll the respective contents within a range of up to a maximum extent of "content 1" in the left direction starting from the selected content "content 58". Here, although not illustrated in FIG. 3C, the respective contents can be displayed including the corresponding contents names. For example, the respective contents can be displayed, including phone numbers such as "012-345-6789" and names of users of the phone numbers. Accordingly, the user can change the order of the selected phone number, with reference to the phone numbers and names included in the respective contents.

Figure 3D:
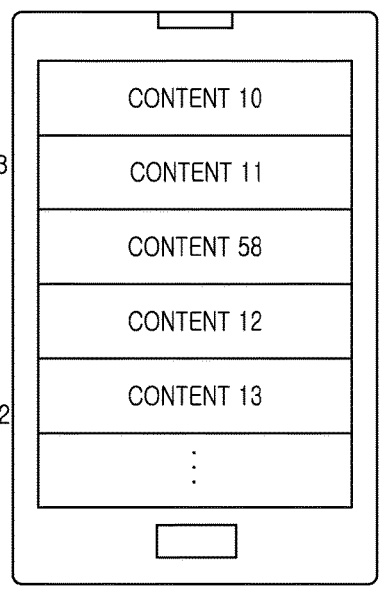

Referring to FIG. 3D, if the electronic device senses that the touch input of the icon 303 has ended, the electronic device can move the selected content to a location corresponding to where the touch input of the icon 303 has ended according to the dragged direction and dragged location of the icon 303, and change the alignment order of the contents. For example, if the electronic device senses that the location in which the touch input of the icon 303 has ended is between "content 11" and "content 12", the electronic device can change the location of the selected content "content 58" into a location between the "content 11" and the "content 12".

Accordingly, by locating "content 58" that is a frequently used phone number to the fore part of the "C storage region" of the electronic device, the electronic device can select the content "content 58" with less interaction required, that is, without needing to always scroll through contents from beginning to end every time a call is attempted to a frequently called number.

FIGS. 4A, 4B, 4C, and 4D illustrate a diagram illustrating a first embodiment of varying a range of scrolling a plurality of contents according to a dragged direction and sequentially displaying the plurality of contents according to an embodiment of the present disclosure.

In the example below, assume that an electronic device senses that an icon 402 included in a guide interface 401 is dragged in any one direction from among at least a first direction and a second direction after receiving a selection of content intended to be changed in location. Also, assume that the electronic device sets to '10' a multiple unit by which respective contents can be scrolled.

Figures 4A, 4B:
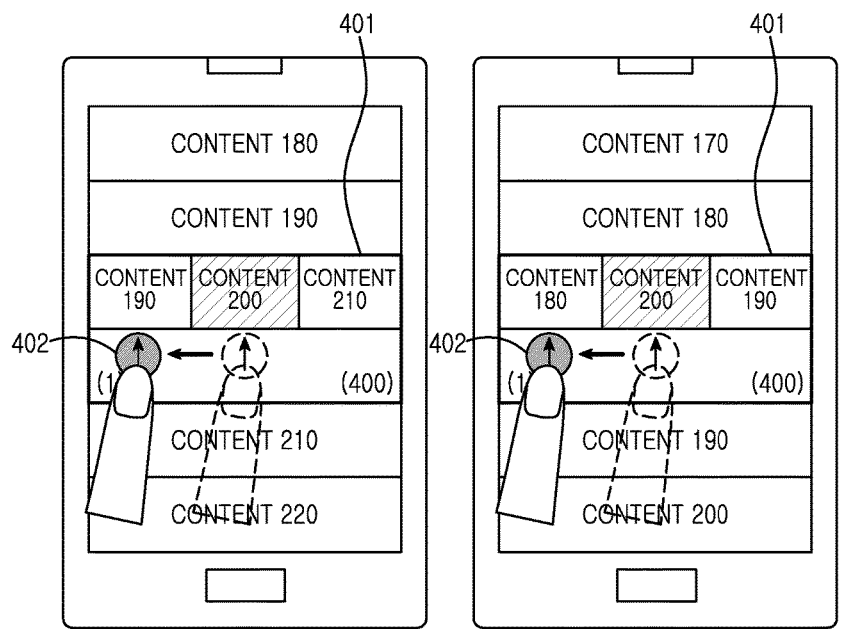
FIGS. 4A, 4B, 4C, and 4D illustrate a diagram illustrating the first embodiment of varying a range of scrolling a plurality of contents according to a dragged direction and sequentially displaying the plurality of contents according to an embodiment of the present disclosure.

Referring to FIGS. 4A and 4B, the electronic device can confirm that the respective contents are sequentially scrolled in the set multiple unit according to the dragged direction of the icon 402. In more detail, the electronic device can sense that the icon 402 is dragged in any one direction from among at least the first direction and the second direction on a basis of selected content intended to be changed in location, and confirm that the respective contents are sequentially scrolled by the set multiple unit. For example, as illustrated in FIG. 4A, the electronic device can confirm that the icon 402 included in the guide interface 401 is dragged to the left, and sequentially scroll the contents to the left in the contents unit of '10' on a basis of the selected content "content 200". That is, the electronic device can sequentially display the contents, by the contents unit of '10' in order to receive a selection of a location to which the user intends to move the selected content "content 200", in an order of "content 190", "content 180", etc., on a basis of the location of the selected content "content 200" in the storage region.

Figures 4C, 4D:
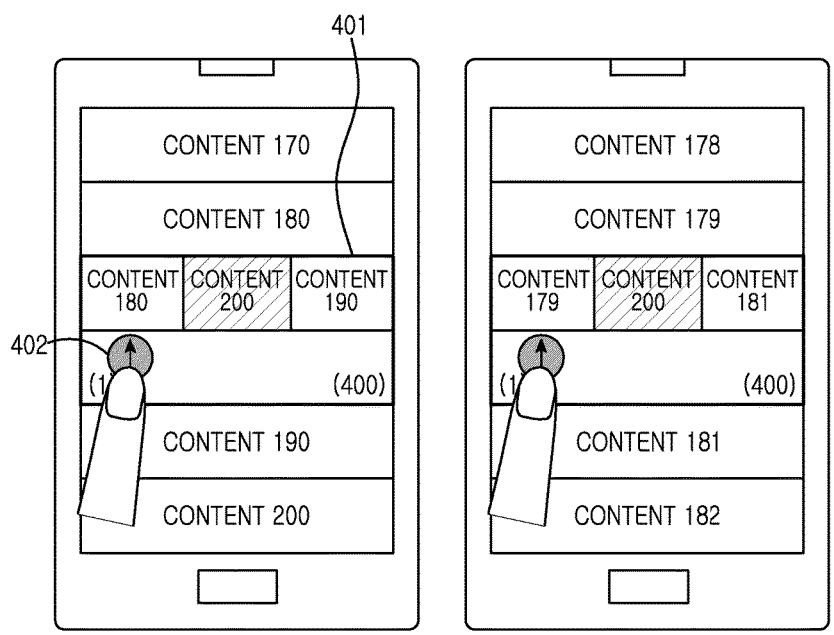

Referring to FIG. 4C, the electronic device can sense that the icon 402 is not dragged during a set time. In more detail, the electronic device can sense that the icon 402 included and displayed in the guide interface 401 is not dragged during the set time with its touch input being maintained. Here, when the electronic device senses that the icon 402 included and displayed in the guide interface 401 is not dragged with its touch input being maintained during the set time, the electronic device changes the unit of scrolling the contents. For example, if the set time is equal to 3 seconds, the electronic device can sense that the icon 402 included and displayed in the guide interface 401 is not dragged with its touch input being held during the set time, i.e., 3 seconds, and determine accordingly to change the unit of scrolling the contents.

Referring to FIG. 4D, if the electronic device senses that the icon 402 is again dragged after the set time elapses, the electronic device can sequentially scroll the respective contents, individually, according to a dragged direction, and display the scrolling result. In more detail, if the electronic device again senses the dragging of the icon 402 after the set time elapses, the electronic device can vary a scrolling range, sequentially scroll the contents, individually, according to the dragged direction of the icon 402, and display the scrolling result. For example, after the electronic device senses that the icon 402 is not dragged with holding its touch input during the set time, i.e., 3 seconds, when the electronic device again senses that the icon 402 is dragged, the electronic device can reduce a range of scrolling the contents from the contents unit of '10' and sequentially scroll the contents in the contents unit of '1'.

Accordingly, the electronic device can provide a convenience to a user by differentiating a range of scrolling on a basis of selected content. That is, the electronic device has an advantage of reducing time and a required interaction of the user, by enlarging a range of scrolling contents so as to enlarge an initial movement range of content and then decreasing the range of scrolling the contents so as to provide a more detailed range of scrolling the contents.

FIGS. 5A, 5B, 5C, and 5D illustrate a diagram illustrating a second embodiment of varying a range of scrolling a plurality of contents according to a dragged direction and sequentially displaying the plurality of contents according to an embodiment of the present disclosure.

In the example below, assume that an electronic device senses that an icon 502 included in a guide interface 501 is dragged in any one direction from among at least a first direction and a second direction after receiving a selection of content intended to be changed in location. Also, assume that the electronic device sets to '10' a multiple unit by which respective contents can be scrolled.

Referring to FIGS. 5A and 5B, the electronic device can confirm that the respective contents are sequentially scrolled in the set multiple unit (i.e., '10') according to the dragged direction of the icon 502. In more detail, the electronic device can sense that the icon 502 is dragged in any one direction from among at least the first direction and the second direction on a basis of selected content intended to be changed in location, and confirm that the respective contents are sequentially scrolled by the set multiple unit. For example, as illustrated in FIG. 5A, the electronic device can confirm that the icon 502 included in the guide interface 501 is dragged to the left, and sequentially scroll the contents to the left by the contents unit of '10' on a basis of the selected content "content 200". That is, the electronic device can sequentially display the contents by the contents unit of '10', in order to receive a selection of a location to which the user intends to move the selected content "content 200", in an order of "content 190", "content 180", etc. on a basis of the location of the selected content "content 200" in the storage region.

Referring to FIG. 5C, the electronic device can sense that the icon 502 is dragged in a set third direction. In more detail, the electronic device can sense that the icon 502 included in the guide interface 501 is dragged in the set third direction with its touch input being maintained. For example, the electronic device can sense that the icon 502 included in the guide interface 501 is dragged in the set third direction, i.e., moved in a clockwise direction or a counterclockwise direction with its touch input being maintained.

Here, when the electronic device senses that the icon 502 included and displayed in the guide interface 501 is dragged in the third direction with its touch input being maintained, the electronic device changes the unit of scrolling the contents. For example, if the set third direction is the clockwise direction, the electronic device can sense that the icon 502 included and displayed in the guide interface 501 is dragged in the clockwise direction that is the set third direction with its touch input being maintained, and change the unit of scrolling the contents accordingly.

Referring to FIG. 5D, if the electronic device confirms that the icon 502 is dragged in the set third direction, the electronic device can sequentially scroll the respective contents individually according to a dragged first direction or second direction and display the scrolling result. In more detail, if the electronic device confirms that the icon 502 included in the guide interface 501 is dragged in the set third direction while maintaining its touch input, the electronic device can vary a scrolling range, sequentially scroll the contents individually according to the dragged direction of the icon 502, and display the scrolling result. For example, if the electronic device senses that the icon 502 is dragged in the clockwise direction that is the set third direction with holding its touch input, the electronic device can reduce a range of scrolling the contents in the contents unit of '10' and sequentially scroll the contents in the contents unit of '1'.

Accordingly, the electronic device can provide a convenience to a user by differentiating a range of scrolling on a basis of selected content. That is, the electronic device has an advantage of reducing time and required interaction of the user, by enlarging a range of scrolling contents so as to enlarge an initial movement range of content and then, if sensing operation, decreasing the range of scrolling the contents so as to provide a more detailed range of scrolling the contents.

Figure 6:
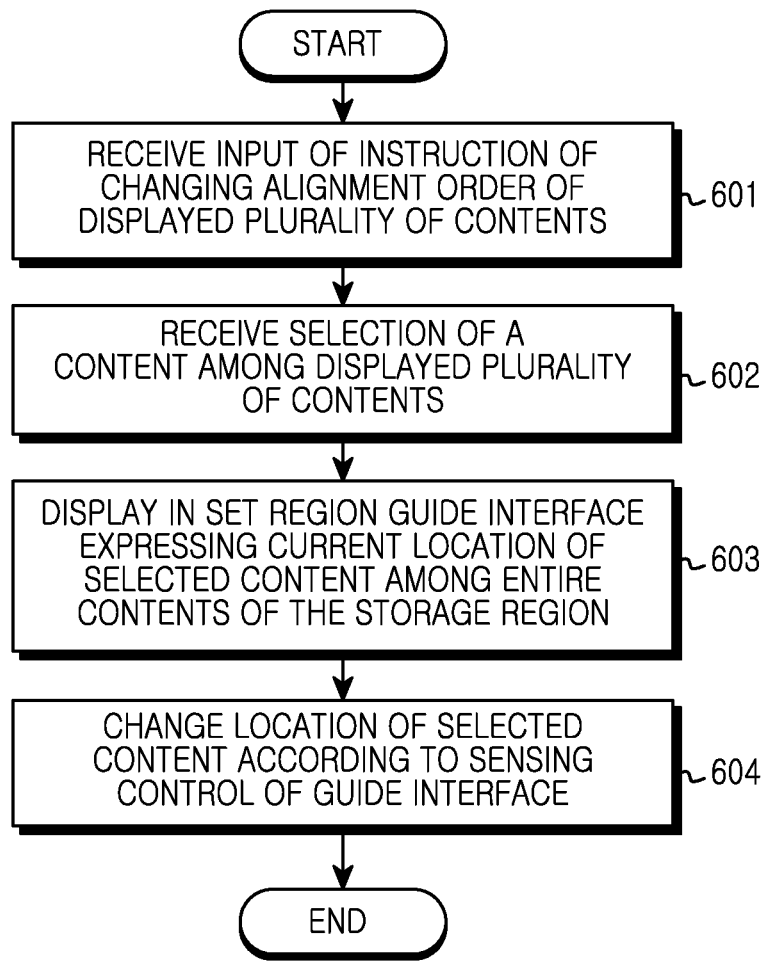
FIG. 6 is a flowchart illustrating a method of operating an electronic device according to an embodiment of the present disclosure.

FIG. 6 is a flowchart illustrating a method of operating an electronic device according to an embodiment of the present disclosure.

Referring to FIG. 6, the electronic device can receive an input of an instruction of changing the alignment order of a displayed plurality of contents at operation 601. For example, the electronic device can receive a selection of an "A storage region" having stored contents related to images, display a plurality of contents included in the selected "A storage region", and receive an input of an instruction of changing the alignment order of the displayed plurality of contents.

After that, the electronic device can receive a selection of a content among the displayed plurality of contents at operation 602. For example, when the electronic device intends to move to the front a first image that a user often selects and opens from among the plurality of images stored in the "A storage region" of the electronic device, the electronic device can receive a selection of the first image intended to be moved in location to the fore part of the "A storage region".

Next, the electronic device can display in a set region a guide interface expressing a current location of the selected content among the entire contents of the storage region at operation 603. In more detail, the electronic device can display a guide interface that is a region expressing a number of the entire contents and a current location of the selected content among the entire contents in the storage region, within a range of the number of the entire contents. Alternately, the electronic device can display a guide interface that is a region expressing the current location of the selected content among the entire contents of the storage region by a percentage. Alternately, the electronic device can display a guide interface that is a region dividing the entire contents into two regions on a basis of the selected content and expressing the division result. Here, the two regions can be regions including a first region expressing to start from the first content and locate the selected content at the opposite end according to the alignment order of the entire contents and a second region expressing to start from the selected content and sequentially locate contents following the selected content.

Next, the electronic device can change the location of the selected content according to sensing the control of the guide interface at operation 604. In more detail, as an icon is dragged in a first direction or a second direction, the electronic device can scroll the respective contents, including corresponding contents names, according to the dragged direction of the icon and display the scrolling result and then the electronic device can move the selected content to a location corresponding to where a touch input of the icon has ended according to the dragged direction and dragged location of the icon and change the alignment order of the contents.

Figure 7:
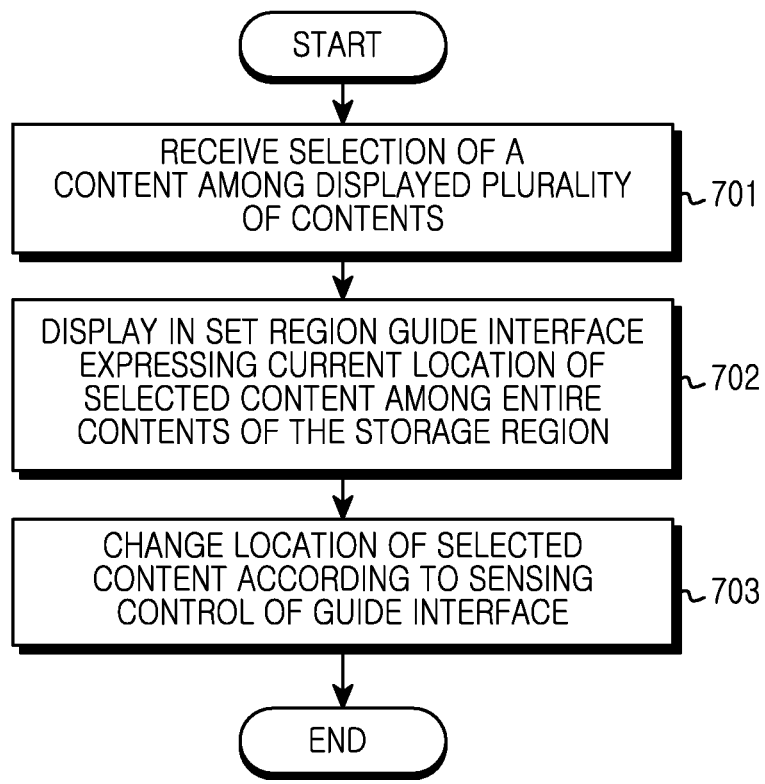
FIG. 7 is a flowchart illustrating a method of operating an electronic device according to another embodiment of the present disclosure.

FIG. 7 is a flowchart illustrating a method of operating an electronic device according to another embodiment of the present disclosure.

Referring to FIG. 7, the electronic device can receive a selection of a content from among a displayed plurality of contents at operation 701. For example, when the electronic device intends to move to the rear a first image that a user infrequently selects from among the plurality of images stored in a "A storage region" of the electronic device, the electronic device can receive a selection of the first image intended to be moved in location to the rear part of the "A storage region".

Next, the electronic device can display in a set region a guide interface expressing a current location of the selected content among the entire contents of the storage region at operation 702. In more detail, the electronic device can display a guide interface that is a region expressing the current location of the selected content within a range of the number of the entire contents, a guide interface that is a region expressing the current location of the selected content among the entire contents region by a percentage, and a guide interface that is a region dividing the entire contents into two regions on a basis of the selected content and expressing the division result.

Next, the electronic device can change the location of the selected content according to sensing the control of the guide interface at operation 703. In more detail, as an icon is dragged in a first direction or a second direction, the electronic device can scroll respective contents, including corresponding contents names, according to the dragged direction of the icon and display the scrolling result and then the electronic device can move the selected content to a location corresponding to where a touch input of the icon has ended according to the dragged direction and dragged location of the icon and change the alignment order of the contents. That is, in the electronic device according to the present disclosure, if a user only drags in the first direction or second direction the icon included and displayed in the guide interface displayed in a set region, the user can quickly and easily change the order of the content to a desired location. Accordingly, the electronic device according to the present disclosure is able to not only improve a convenience of the user but also quickly and easily move the content intended to be changed in location to the desired location, thereby decreasing an interaction time required of the user to achieve the desired result.

Figure 8:
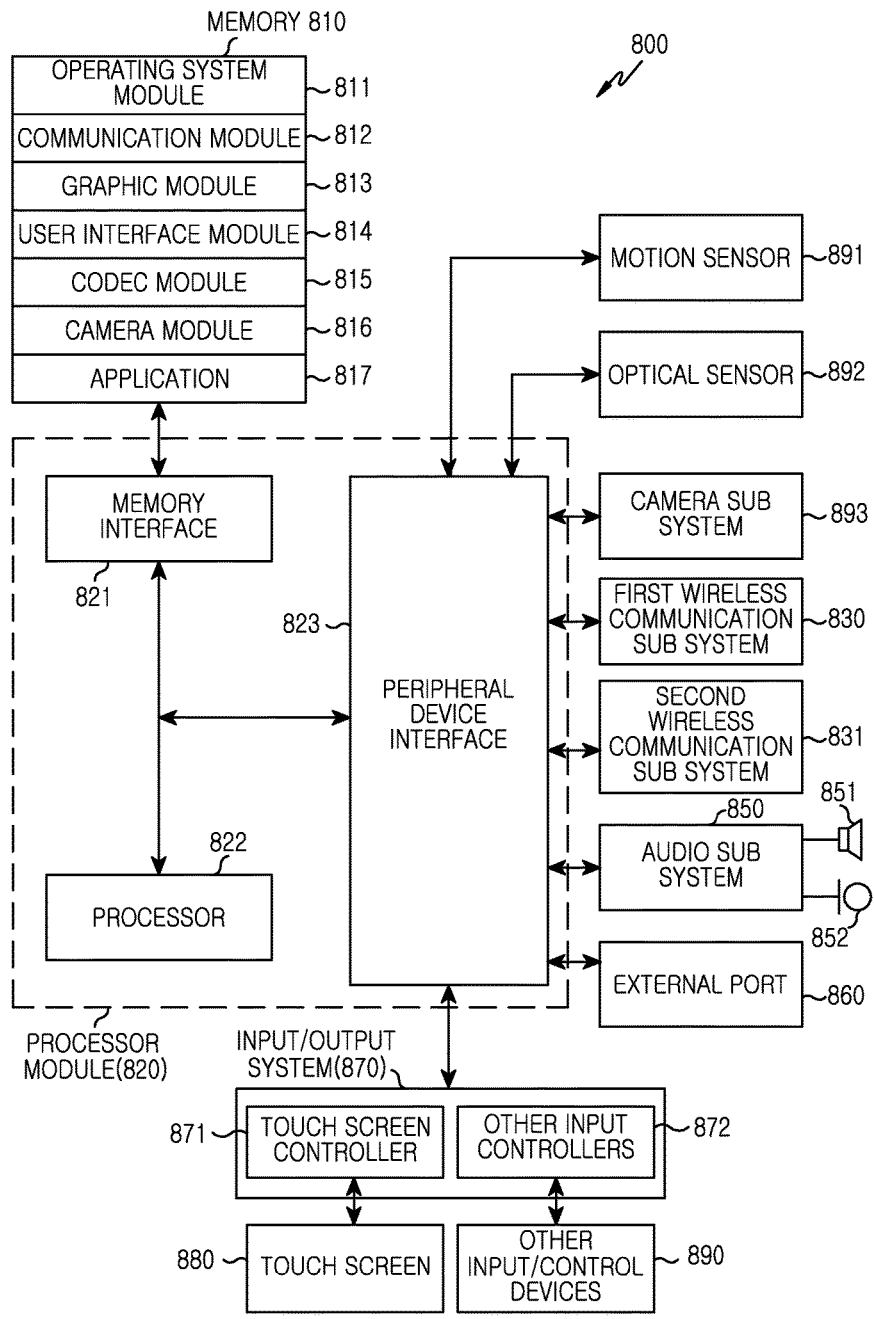
FIG. 8 is a block diagram illustrating a construction of an electronic device according to an embodiment of the present disclosure.

FIG. 8 is a block diagram illustrating a construction of an electronic device according to an embodiment of the present disclosure. This electronic device 800 can be a portable electronic device, and can be a device such as a portable terminal, a mobile phone, a mobile pad, a media player, a tablet computer, a handheld computer, or a Personal Digital Assistant (PDA). Also, the electronic device may be any portable electronic device including a device having a combination of two or more functions among these devices.

Referring to FIG. 8, the electronic device 800 may include a memory 810, a processor module 820, a first wireless communication sub system 830, a second wireless communication sub system 831, an audio sub system 850, a speaker 851, a microphone 852, an external port 860, an Input Output (10) sub system 870, a touch screen 880, and other input/control devices 890. The memory 810 and the external port 860 can be used in plural.

The processor module 820 can include a memory interface 821, one or more processors 822 and a peripheral device interface 823. According to cases, the entire processor module 820 may be also called a processor. In the present disclosure, the processor module 820 can change the location of selected content according to sensing the control of a guide interface. Also, the processor module 820 can confirm that an icon is dragged in a first direction or second direction in a state where a touch input of the icon is maintained and, if the touch input of the icon is ended, the processor module 820 can move the selected content to a location corresponding to where the touch input of the icon is ended according to the dragged direction and dragged location of the icon and change the alignment order of contents. Also, if sensing that the icon is dragged in the first direction or second direction, the processor module 820 can confirm that the respective contents are sequentially scrolled by a set multiple unit according to the dragged direction of the icon, and sense that the icon is not dragged during a set time. Also, if sensing that the icon is dragged in the first direction or second direction, the processor module 820 can confirm that the respective contents are scrolled by the set multiple unit according to the dragged direction of the icon, and can sense that the icon is dragged in a set third direction.

The processor module 820 executes various software programs to perform various functions for the electronic device 800 and also performs processing and control for voice communication and data communication. Also, in addition to this general function, the processor 822 plays a role of executing specific software modules (i.e., instruction sets) stored in the memory 810 to perform specific various functions corresponding to the software modules. That is, the processor 822 interworks with the software modules stored in the memory 810 to carry out a method of an embodiment of the disclosure.

The processor 822 can include one or more data processors, image processors, or COder/DECoders (CODECs). The data processor, the image processor, or the CODEC may be constructed separately. Also, the processor 822 may be composed of several processors performing different functions. The peripheral device interface 823 connects the IO sub system 870 and various peripheral devices of the electronic device 800 to the processor 822 and to the memory 810 through the memory interface 821.

Various constituent elements of the electronic device 800 can be coupled with one another by one or more communication buses (not denoted by reference numerals) or stream lines (not denoted by reference numerals).

The external port 860 is used for directly connecting the portable electronic device 800 to other electronic devices or for indirectly connecting the portable electronic device 800 to the other electronic devices over a network (for example, the Internet, an intranet, a wireless Local Area Network (LAN), and the like). For example, the external port 860 may refer to, although is not limited to, a Universal Serial Bus (USB) port, a FIREWIRE port, and the like.

A motion sensor 891 and an optical sensor 892 may be coupled to the peripheral interface 823 and enable various functions. For instance, the motion sensor 891 and the optical sensor 892 can be coupled to the peripheral interface 823 and sense a motion of the electronic device 800 and sense light from the exterior of the device, respectively. In addition to this, a Global Positioning System (GPS) receiver and other sensors such as a temperature sensor, a biometric sensor, and the like, can be coupled to the peripheral interface 823 and perform related functions.

A camera sub system 893 can perform a camera function such as photography and video clip recording.

The optical sensor 892 can use a Charged Coupled Device (CCD) device or a Complementary Metal-Oxide Semiconductor (CMOS) device.

A communication function is performed through one or more wireless communication subsystems 830 and 831. The first wireless communication sub system 830 and the second wireless communication sub system 831 can include a Radio Frequency (RF) receiver and transceiver and/or an optical (e.g., infrared) receiver and transceiver. The first wireless communication sub system 830 and the second wireless communication sub system 831 can be distinguished according to a communication network in which the electronic device 800 communicates. For example, the communication network can include a communication subsystem designed to operate through, although not limited to, a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a WiFi network, a Wireless interoperability for Microwave Access (WiMAX) network, a BLUETOOTH network, and the like. The first wireless communication subsystem 830 and the second wireless communication subsystem 831 may be combined and constructed as one wireless communication subsystem.

The audio subsystem 850 can be coupled to the speaker 851 and the microphone 852 and can take charge of input and output of an audio stream such as voice recognition, voice replication, digital recording, and phone functions. That is, the audio sub system 850 communicates with a user through the speaker 851 and the microphone 852. The audio sub system 850 receives a data stream through the peripheral device interface 823 of the processor module 820, converts the received data stream into an electric stream, and forwards the converted electric stream to the speaker 851. The speaker 851 converts the electric stream into human-audible sound waves and outputs the converted sound waves. The microphone 852 converts sound waves forwarded from human or other sound sources into electric streams. The microphone 852 forwards the converted electric streams to the audio sub system 850. The audio subsystem 850 converts the received electric streams into audio data streams, and forwards the converted audio data streams to the peripheral interface 823. The audio subsystem 850 can include a detachable earphone, headphone, or headset.

The IO subsystem 870 can include a touch screen controller 871 and/or other input controllers 872. The touch screen controller 871 can be coupled to the touch screen 880. The touch screen 880 and the touch screen controller 871 can detect a contact and a motion or an interruption thereof, by using, though not limited to, capacitive, resistive, infrared and surface acoustic wave technologies for determining one or more contact points with the touch screen 880, but also any multi-touch sensing technology including other proximity sensor arrays or other elements. The other input controllers 872 can be coupled to the other input/control devices 890. The other input/control devices 890 can include at least one or more buttons, a rocker switch, a thumb-wheel, a dial, a stick, a pointer device such as a stylus, and the like.

The touch screen 880 provides an input-output interface between the electronic device 800 and a user. That is, the touch screen 880 forwards a user's touch input to the electronic device 800. Also, the touch screen 880 is a medium for displaying an output of the electronic device 800 to the user. That is, the touch screen 880 shows a visual output to the user. This visual output can be presented in the form of a text, a graphic, a video, and a combination thereof. The touch screen 880 according to the present disclosure can receive a selection of a content from among a displayed plurality of contents, and display in a set region a guide interface expressing a current location of the selected content among the entire contents of the storage region. Also, the touch screen 880 can receive a selection of a storage region from among at least one storage region each including a plurality contents, display the plurality of contents included in the selected storage region, and receive an input of an instruction of changing the alignment order of the displayed plurality of contents. Also, the touch screen 880 can receive a touch input of an icon included in the guide interface expressing the current location of the selected content. Also, as the icon is dragged in a first direction or second direction, the touch screen 880 can vary a range of scrolling the respective contents, including contents names, according to the dragged direction of the icon and display the scrolling result. Also, if sensing that the icon is again dragged after a set time elapses, the touch screen 880 can sequentially scroll the respective contents, individually, according to the dragged direction of the icon and display the scrolling result. Also, the touch screen 880 can sequentially scroll the respective contents, individually, according to the dragged first direction or second direction and display the scrolling result.

The touch screen 880 can use various displays. For example, the touch screen 880 can use, although is not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The memory 810 can be coupled to the memory interface 821. The memory 810 can include high-speed Random Access Memory (RAM) and/or non-volatile memory such as one or more magnetic disk storage devices, one or more optical storage devices, and/or flash memories (for example, Not AND (NAND) memories, Not OR (NOR) memories).

The memory 810 stores software. A software constituent element includes an Operating System (OS) module 811, a communication module 812, a graphic module 813, a user interface module 814, a Motion Picture Experts Group (MPEG) module 815, a camera module 816, one or more application modules 817, and the like. Also, because the module, the software constituent element, can be expressed as a set of instructions, the module may be also called an instruction set. The module may be also called a program. The OS module 811 (for example, an embedded operating system such as WINDOWS, LINUX, Darwin, RTXC, UNIX, OS X, or VxWorks) includes various software constituent elements controlling general system operation. Control of the general system operation represents memory management and control, storage hardware (device) control and management, power control and management, and the like. This OS software also performs a function of controlling communication between various hardware (devices) and software constituent elements (modules).

The communication module 812 can perform communication with other electronic device such as a computer, a server, a portable terminal, and the like, through the first and second wireless communication sub systems 830 and 831 or the external port 860.

The graphic module 813 may include various software constituent elements for providing and displaying a graphic on the touch screen 880. The term of graphic is used as meaning including a text, a web page, an icon, a digital image, a video, an animation, and the like.

The user interface module 814 includes various software constituent elements associated with a user interface. Further, the user interface module 814 includes information about how a state of the user interface is changed or whether the change of the state of the user interface is carried out in which condition, and the like.

The CODEC module 815 can include a software constituent element related to encoding and decoding of a video file. The CODEC module 815 can include a video stream module such as an MPEG module and/or H204 module. Also, the CODEC module can include various audio file CODEC modules such as Authentication, Authorization and Accounting (AAA), Adaptive Multi-Rate (AMR), Windows Media Audio (WMA), and the like. Also, the CODEC module 815 includes an instruction set corresponding to a method of implementing the present disclosure.

The camera module 816 may include a camera-related software constituent element for enabling camera-related processes and functions.

The application module 817 may include a browser, an electronic mail (e-mail), an instant message, word processing, keyboard emulation, an address book, a touch list, a widget, Digital Right Management (DRM), voice recognition, voice replication, a position determining function, a location-based service, and the like.

Also, various functions of the electronic device 800 according to the present disclosure mentioned above and to be mentioned below can alternatively be executed by hardware including one or more stream processing and/or Application Specific Integrated Circuits (ASICs), and/or software, and/or a combination of them.

FIGS. 9A, 9B, 9C, and 9D illustrate a diagram illustrating a third embodiment of varying a range of scrolling a plurality of contents according to a dragged direction and sequentially displaying the plurality of contents according to an embodiment of the present disclosure.

In the example below, assume that an electronic device senses that an icon 902 included in a guide interface 901 is dragged in a direction from among at least a first direction and a second direction after receiving a selection of content intended to be changed in location. Also, assume that the electronic device has set to '10' a multiple unit by which respective contents can be scrolled.

Figure 9A:
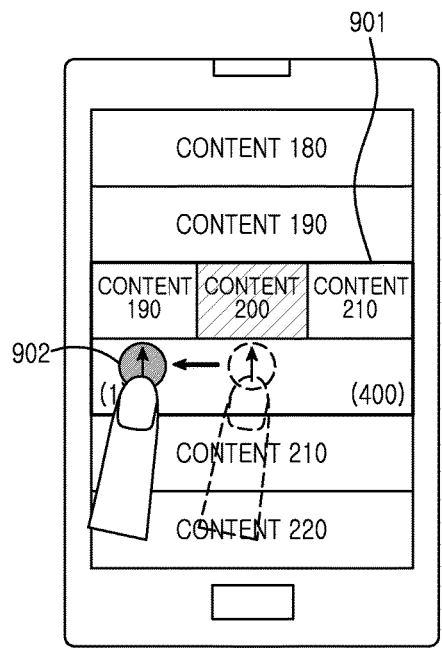
FIGS. 9A, 9B, 9C, and 9D illustrate a diagram illustrating the third embodiment of varying a range of scrolling a plurality of contents according to a dragged direction and sequentially displaying the plurality of contents according to an embodiment of the present disclosure.
Figure 9B:
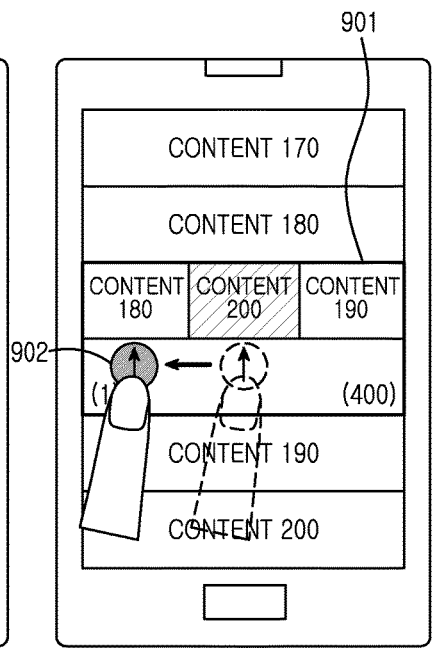

Referring to FIGS. 9A and 9B, the electronic device can confirm that the respective contents are sequentially scrolled by the set multiple unit according to the dragged direction of the icon. In more detail, the electronic device can sense that the icon 902 is dragged in a direction from among at least the first direction and the second direction on a basis of selected content intended to be changed in location, and confirm that the respective contents are sequentially scrolled by the set multiple unit. For example, as illustrated in FIG. 9A, the electronic device can confirm that the icon 902 included in the guide interface 901 is dragged to the left, and sequentially scroll the contents to the left by the contents unit of '10' on a basis of the location of the selected content "content 200" in the storage region. That is, the electronic device can sequentially display the contents by the contents unit of '10', in order to receive a selection of a location to which the user intends to move the selected content "content 200", in an order of "content 190", "content 180", etc., on a basis of the location the selected content "content 200" in the storage region.

Figure 9C:
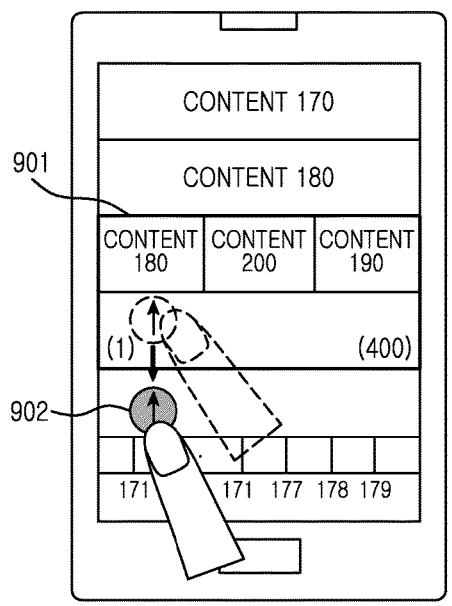
Figure 9D:
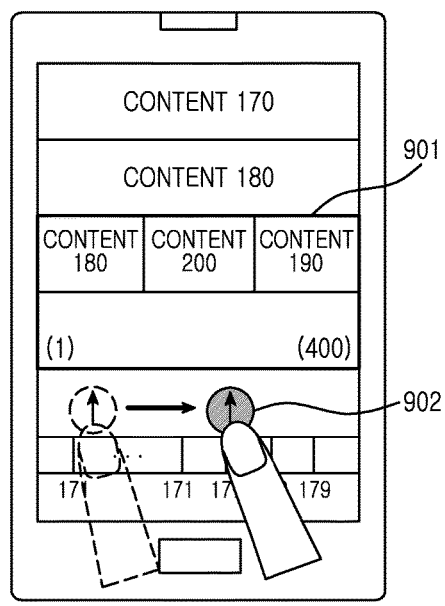

Referring to FIGS. 9C and 9D, the electronic device can sense that the icon 902 is dragged in a set third direction. In more detail, the electronic device can sense that the icon 902 included in the guide interface 901 is dragged in the set third direction with its touch input being maintained. For example, the electronic device can sense that the icon 902 included in the guide interface 901 is dragged in a down direction that is the set third direction with its touch input being maintained.

Here, when the electronic device senses that the icon 902 included and displayed in the guide interface 901 is dragged in the third direction with its touch input being maintained, the electronic device changes the unit of scrolling the contents. For example, as illustrated in FIG. 9C, assuming that the set third direction is the down direction, the electronic device can sense that the icon 902 included and displayed in the guide interface 901 is dragged in the set third direction, i.e., the down direction with its touch input being maintained, and change the unit of scrolling the contents.

After that, as illustrated in FIG. 9D, if confirming that the icon 902 is dragged in the set third direction, after displaying a detailed contents unit, the electronic device can sequentially scroll the respective contents, individually, according to a dragged first direction or second direction and display the scrolling result. In more detail, if confirming that the icon 902 included in the guide interface 901 is dragged in the set third direction while maintaining its touch input, after displaying the detailed contents unit, the electronic device can sequentially scroll the contents, individually, according to the dragged direction of the icon and display the scrolling result. For example, if sensing that the icon 902 is dragged in the set third direction, i.e., the down direction while maintaining its touch input, the electronic device can reduce a range of scrolling the contents from the contents unit of '10' and display the detailed contents unit and then, sequentially scroll the contents in the contents unit of '1'.

For another example, although not illustrated in FIG. 9, assuming that the set third direction is an up direction, the electronic device can sense that the icon 902 included and displayed in the guide interface 901 is dragged in the set third direction, i.e., the up direction with its touch input being held, and change the unit of scrolling the contents. The contents unit may similarly be increased in such a manner, for example, from '1' to '10', if the user wishes to change from the detailed scrolling back to the larger range scrolling.

Accordingly, the electronic device can provide a convenience to a user by differentiating a range of scrolling on a basis of selected content. That is, the electronic device has an advantage of reducing time and required interaction of the user, by enlarging a range of scrolling contents so as to enlarge the initial movement range of content and then, if sensing operation, decreasing the range of scrolling the contents so as to provide a more detailed range of scrolling the contents.

It will be appreciated that various embodiments of the present disclosure according to the claims and description in the specification can be realized in the form of hardware, software, or a combination of hardware and software. Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device such as a Read Only Memory ROM), whether erasable or rewritable or not, or in the form of memory such as, for example, RAM, memory chips, device or integrated circuits, or on an optically or magnetically readable medium such as, for example, a Compact Disc (CD), Digital Versatile Disc (DVD), magnetic disk or magnetic tape, and the like. It will be appreciated that the storage devices and storage media are various embodiments of machine-readable storage that are suitable for storing a program or programs comprising instructions that, when executed, implement various embodiments of the present disclosure. Accordingly, various embodiments provide a program comprising code for implementing an apparatus or a method as claimed in any one of the claims of this specification and a machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
    displaying a plurality of contents included in a list on a touch screen of the electronic device;
    receiving a first input for selecting, among the displayed plurality of contents, a content which is aligned at a first location in the list;
    in response to receiving the first input, displaying a guide interface embedded in the list in a region corresponding to a location at which the selected content is displayed in the touch screen, the guide interface including an icon and an indicator representing an order in which the selected content among entire contents of the list is aligned;
    changing the order according to a second input, the second input including an input dragging the icon in a first direction or a second direction in a state where a touch input on the icon is maintained, the second direction being a direction opposite to the first direction; and
    changing the first location to a second location corresponding to the changed order,
    wherein the changing of the order further comprises:
        changing a unit by which the order is changed in response to dragging the icon in a clockwise direction or in a counterclockwise direction which is different from the first direction or the second direction, and displaying, with the selected content, contents which are aligned by the changed unit on the touch screen while changing the order by the changed unit.

2. The method of claim 1, wherein, prior to the displaying of the plurality of contents included in the list, the list among at least one list is selected.

3. The method of claim 1, wherein the indicator represents a number of the entire contents and a number indicating the order in which the selected content among the entire contents in the list is aligned.

4. The method of claim 1, wherein the indicator represents the order by a percentage.

5. The method of claim 1, wherein the guide interface comprises a region dividing the entire contents into two regions on a basis of the order of the selected content.

6. The method of claim 5, wherein the two regions comprise a first region to display a first aligned content through the selected content according to an alignment order of the entire contents and a second region to display the selected content through last content of the list according to the alignment order of the entire contents.

7. The method of claim 1, wherein the changing of the first location comprises, when the touch input of the icon is released, moving the selected content to the second location.

8. An electronic device, the device comprising:
a touch screen; and
at least one processor configured to:
control the touch screen to display a plurality of contents included in a list,
receive a first input for selecting, among the displayed plurality of contents, a content which is aligned at a first location in the list,
in response to receiving the first input, control the touch screen to display a guide interface embedded in the list in a region corresponding to a location at which the selected content is displayed in the touch screen, the guide interface including an icon and an indicator representing an order in which the selected content among entire contents of the list is aligned,
change the order according to a second input, the second input including an input dragging the icon in a first direction or a second direction in a state where a touch input on the icon is maintained, the second direction being a direction opposite to the first direction, and
change the first location to a second location corresponding to the changed order,
wherein at least one processor is further configured to:
change a unit by which the order is changed in response to dragging the icon in a clockwise direction or in a counterclockwise direction which is different from the first direction or the second direction, and
control the touch screen to display, with the selected content, contents which are aligned by the changed unit while changing the order by the changed unit.

9. The electronic device of claim 8, wherein, prior to the display of the plurality of contents included in the list, the touch screen is configured to select the list among at least one list.

10. The electronic device of claim 8, wherein the indicator represents a number of the entire contents and a number indicating the order in which the selected content among the entire contents in the list is aligned.

11. The electronic device of claim 8, wherein the indicator represents the order by a percentage.

12. The electronic device of claim 8, wherein the guide interface comprises a region dividing the entire contents into two regions on a basis of the order of the selected content.

13. The electronic device of claim 12, wherein the two regions comprise a first region to display a first aligned content through the selected content according to an alignment order of the entire contents and a second region to display the selected content through last content of the list according to the alignment order of the entire contents.

14. The electronic device of claim 8, wherein the at least one processor is further configured to:
when the touch input of the icon is released, move the selected content to the second location.

* * * * *